US009015690B2

(12) United States Patent
Ye et al.

(10) Patent No.: US 9,015,690 B2
(45) Date of Patent: Apr. 21, 2015

(54) PROACTIVE LOOP FUSION OF NON-ADJACENT LOOPS WITH INTERVENING CONTROL FLOW INSTRUCTIONS

(75) Inventors: Mei Ye, Portland, OR (US); Dinesh Suresh, Sunnyvale, CA (US); Dz-ching Ju, Saratoga, CA (US); Michael Lai, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1266 days.

(21) Appl. No.: 12/545,811

(22) Filed: Aug. 22, 2009

(65) Prior Publication Data

US 2011/0047534 A1 Feb. 24, 2011

(51) Int. Cl.
*G06F 9/45* (2006.01)

(52) U.S. Cl.
CPC ............... *G06F 8/443* (2013.01); *G06F 8/447* (2013.01); *G06F 8/452* (2013.01); *G06F 8/45* (2013.01)

(58) Field of Classification Search
CPC ......... G06F 8/443; G06F 8/452; G06F 8/447; G06F 8/4434
USPC .................................. 717/160, 151
See application file for complete search history.

(56) References Cited

U.S. PATENT DOCUMENTS

| | | | |
|---|---|---|---|
| 5,274,818 A * | 12/1993 | Vasilevsky et al. ........... 717/149 | |
| 5,822,593 A | 10/1998 | Lamping et al. | |
| 6,058,266 A * | 5/2000 | Megiddo et al. .............. 717/156 | |
| 6,070,011 A * | 5/2000 | Liu et al. ....................... 717/160 | |
| 6,202,203 B1 * | 3/2001 | Ng ................................. 717/151 | |
| 7,779,394 B2 * | 8/2010 | Homing et al. ............... 717/136 | |
| 2007/0169039 A1* | 7/2007 | Lin ................................ 717/146 | |
| 2009/0307675 A1* | 12/2009 | Ng et al. ....................... 717/160 | |
| 2009/0328021 A1* | 12/2009 | Ng et al. ....................... 717/160 | |

OTHER PUBLICATIONS

"Jeanne Ferrante; Karl J. Ottenstein;Joe D. Warren";"The Program Dependence Graph and Its Use in Optimization";"1987";"ACM 0164-0925/87/0700-0319"; "31 pages".*

(Continued)

*Primary Examiner* — Wei Zhen
*Assistant Examiner* — Brahim Bourzik
(74) *Attorney, Agent, or Firm* — Rory D. Rankin; Meyertons, Hood, Kivlin, Kowert & Goetzel, P.C.

(57) ABSTRACT

A system and method for optimization of code with non-adjacent loops. A compiler builds a node tree, which is not a control flow graph, that represents parent-child relationships of nodes of a computer program. Each node represents a control flow statement or a straight-line block of statements of the computer program. If a non-adjacent loop pair of nodes satisfy predetermined conditions, the compiler may perform legal code transformations on the computer program and corresponding node transformations on the node tree. These transformations may make adjacent this pair of loop nodes. The compiler may be configured to perform legal code transformations, such as head and tail duplication, code motion, and if-merging, in order to make adjacent these two loop nodes. Then loop fusion may be performed on this loop pair in order to increase instruction level parallelism (ILP) within an optimized version of the original source code.

16 Claims, 11 Drawing Sheets

(56) References Cited

OTHER PUBLICATIONS

Bertrand A. Maher Aaron Smith Doug Burger Kathryn S. McKinley;"Merging Head and Tail Duplication for Convergent Hyperblock Formation";"2006";"The 39th Annual IEEE/ACM International Symposium on Microarchitecture (MICRO'06) 0-7695-2732-9/06";"12 pages".*

"Bob Blainey, Christopher Barton, José Nelson Amaral";"Removing Impediments to Loop Fusion Through Code Transformations";"2005";"Spring Berlin Heidelberg";"vol. 2481";"pp. 309-328".*

"Kennedy et al";"maximizing loop parallelism and improving data locality via loop fusion and distribution";"Aug. 1993";"20 pages".*

"Megido et al";"Optimal Weighted Loop Fusion for Parallel Programs";"1997";"10 pages".*

"Kandemir et al";"An Evaluation of Code and Data Optimizations in the Context of Disk Power Reduction";"Aug. 10, 2005";"6 pages".*

Topic C: Loop Fusion, Kit Barton; www.cs.ualberta.ca/~cbarton; Mar. 14, 2002. CMPUT680-Winter 2006; pp. 1-50.

* cited by examiner

Table 200

| Node Types within a Node Tree ||
|---|---|
| Node Type | Description |
| FUNC | a node that represents the top-level node for a function |
| IF | a node that marks the beginning of an if-region |
| THEN | a node that marks the fall-through path of an if-region |
| ELSE | a node that marks the non-fall-through path of an if-region |
| LOOP | a node that marks the beginning of a loop region |
| BLOCK | a node that represents straight line block of code |

FIG. 2

Table 800

| Intermediate Transformations for Non-Adjacent Loop Candidates ||| 
|---|---|---|
| First Node | Second Node | Transformation |
| LOOP | BLOCK | Safe code motion of Second Node above First Node. Iteration continues on First Node. |
| IF | BLOCK | Tail-duplication of Second Node into First Node. Iteration continues on First Node. |
| LOOP | IF | Head duplication of First Node into Second Node. Iteration continues on Second Node. |
| IF | IF | If-merging or tail duplication of Second Node into First Node. Iteration continues on First Node. |
| IF | LOOP | Tail duplication of Second Node into First Node. Iteration continues on First Node. |

*FIG. 8*

Code Transformations 1000

Code 440
```
if (cond1) {
    if (cond2) {
        for (i = 0; i < n; i++) {
            if (a[i] & (1 << c1))
                a[i] ^= ( 1 << t);
        }
        return;
        counter++;
        for (i = 0; i < n; i++) {
            if (a[i] & ( 1 << c2))
                a[i] ^= ( 1 << t);
        }
    }
    else {
        for (i = 0; i < n; i++) {
            if (a[i] & (1 << c1))
                a[i] ^= ( 1 << t);
        }
        counter++;
        for (i = 0; i < n; i++) {
            if (a[i] & ( 1 << c2))
                a[i] ^= ( 1 << t);
        }
    }
}
```

Code 450
```
if (cond1) {
    if (cond2) {
        for (i = 0; i < n; i++) {
            if (a[i] & (1 << c1))
                a[i] ^= ( 1 << t);
        }
        return;
        counter++;
        for (i = 0; i < n; i++) {
            if (a[i] & ( 1 << c2))
                a[i] ^= ( 1 << t);
        }
    }
    else {
        counter++;
        for (i = 0; i < n; i++) {
            if (a[i] & (1 << c1))
                a[i] ^= ( 1 << t);
        }
        for (i = 0; i < n; i++) {
            if (a[i] & ( 1 << c2))
                a[i] ^= ( 1 << t);
        }
    }
}
```

After tail duplication transformation

After code motion transformation

Transformations

FIG. 10

PROACTIVE LOOP FUSION OF NON-ADJACENT LOOPS WITH INTERVENING CONTROL FLOW INSTRUCTIONS

BACKGROUND OF THE INVENTION

1. Field of the Invention

This invention relates to computing systems, and more particularly, to program code optimization.

2. Description of the Relevant Art

The performance of computing systems is generally dependent on both hardware and software. As generating performance from hardware design becomes increasingly costly and/or difficult, attention turns to new methods of software design. For example, regarding the hardware of a system, the geometric dimensions of devices and metal routes on each generation of semiconductor chips continues to decrease. This reduction leads to increases in cross capacitance effects on wires, parasitic inductance effects on wires, and electrostatic field effects within transistors, which in turn increases the circuit noise effects on-chip and propagation delays. In addition, the number of nodes that may switch per clock cycle significantly increases as more devices are used in each new generation. This trend leads to an increase in power consumption with each new generation of processors. Accordingly, operational frequency of the processor may be limited by these noise and power effects, which may also limit the performance of the hardware.

In addition to improvements in hardware, software developers also seek ways to increase computing performance or optimize use of computing resources. When software developers write program code, the program code may not always be written in an efficient manner. Often times program code may be too large and complex for any individual to readily identify inefficiencies or identify opportunities for optimization. Additionally, project changes or changes in the personnel developing the program code may lead to unnecessary overhead or other inefficiencies being introduced into the program code. One approach to program code optimization is to develop and use sophisticated compilers to analyze the program code and perform optimizations. For example, loop structures are one type of program construct that may lead to bottleneck points in program performance. Therefore, optimizing compilers may include techniques for performing loop optimization in order to improve program performance.

Loop fusion is a loop transformation technique which replaces multiple loops with a single one. For example, consider the following piece of pseudo-code with adjacent loops:

```
int i, a[100], b[100];           /* line 1 */
for (i = 0; i < 100; i++) {
    a[i] = 1;
}
for (i = 0; i < 100; i++) {      /* line 5 */
    b[i] = 2;
}
```

The above code has two adjacent for-loop constructs. These adjacent loops have a same initial value of 0, a same trip count of 100, and a same increment value by 1. The above code is equivalent to the following code with a single for-loop construct:

```
int i, a[100], b[100];           /* line 8 */
for (i = 0; i < 100; i++) {
    a[i] = 1;
    b[i] = 2;
}                                /* line 12 */
```

Loop fusion is an optimization technique that takes several loops and combines them into a single large loop. Most of the existing work on loop fusion concentrates on data reuse or creation of instruction level parallelism opportunities. The legality of each transformation is determined by data dependencies between statements. Thus, reordering transformation requires data dependence analysis beforehand.

Loop fusion may reduce loop overhead and memory accesses, increase register usage, and may also lead to other optimizations. By potentially reducing the number of parallelizable loops in a program and increasing the amount of work in each of those loops, loop fusion can greatly reduce parallelization overhead. For example, fewer spawns and joins may be necessary. However, often, the source code provided to a compiler has only small sets of loops that are control flow equivalent, normalized, have the same iteration count, are adjacent, and have no fusion disqualifying conditions, such as an early exit statement within the loop.

In view of the above, efficient methods and mechanisms for efficient optimization of code with non-adjacent loops are desired.

SUMMARY OF EMBODIMENTS OF THE INVENTION

Systems and methods for efficient optimization of code with non-adjacent loops are contemplated. In one embodiment, a compiler is provided that is configured to build a node tree that represents parent-child relationships of nodes of a computer program. In one embodiment, each node in the tree represents a control flow statement or a straight-line block of statements of the computer program. The compiler determines whether to perform one or more legal code transformations on the computer program and one or more corresponding node transformations on the node tree, in response to identifying a loop node pair that satisfy qualifying conditions. For example, the compiler may identify within the node tree a first loop node and a second loop node succeeding in program order to the first loop node. The first and second loop nodes may be non-adjacent with intervening control flow instructions. Additionally, the first and second loop nodes may have a same initial value, a same trip count value, and a same increment value. Further characteristics of these loop nodes within the node tree may need to be satisfied. If so, the compiler may be configured to perform legal code transformations, such as head and tail duplication, code motion, and if-merging, in order to make these two loop nodes adjacent. Subsequently, loop fusion may be performed on this loop pair in order to increase instruction level parallelism (ILP) within an optimized version of the program code.

These and other embodiments are contemplated and will be appreciated upon reference to the following description and figures.

BRIEF DESCRIPTION OF THE DRAWINGS

FIG. 2 is a generalized block diagram illustrating one embodiment of a table holding node types used within a node tree.

FIG. 8 is a generalized block diagram illustrating one embodiment of intermediate transformations used to bring non-adjacent loop candidates together.

FIG. 10 is a generalized block diagram illustrating one embodiment of sample code modified by legal tail duplication and code motion code transformations.

Figure 1:
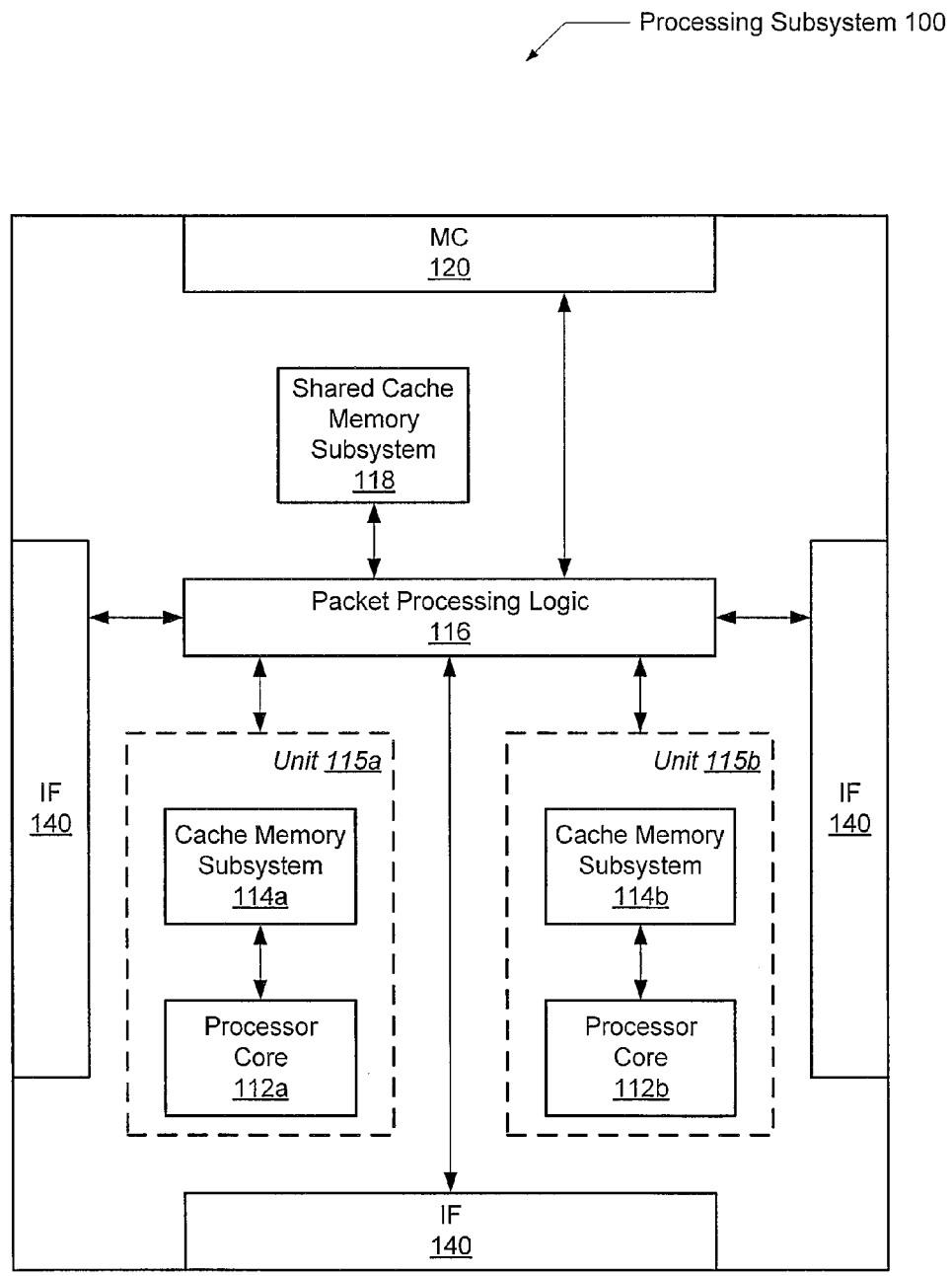
FIG. 1 is a generalized block diagram illustrating one embodiment of an exemplary processing subsystem.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

FIG. 1 is a block diagram of one embodiment of an exemplary processing subsystem 100. Processing subsystem 100 may include memory controller 120, interface logic 140, one or more processing units 115, which may include one or more processor cores 112, cache memory subsystems 114, packet processing logic 116, and a shared cache memory subsystem 118. Processing subsystem 100 may be a node within a multi-node computing system. In one embodiment, the illustrated functionality of processing subsystem 100 is incorporated in a single integrated circuit.

Processing subsystem 100 may be coupled to a respective memory via a memory controller 120. The memory may comprise any suitable memory devices. For example, the memory may comprise one or more dynamic random access memories (DRAMs), synchronous DRAMs (SDRAMs), DRAM, static RAM, etc. Processing subsystem 100 and its memory may have its own address space from other nodes. Processing subsystem 100 may include a memory map used to determine which addresses are mapped to its memory. In one embodiment, the coherency point for an address within processing subsystem 100 is the memory controller 120 coupled to the memory storing bytes corresponding to the address. Memory controller 120 may comprise control circuitry for interfacing to memory. Additionally, memory controllers 120 may include request queues for queuing memory requests.

Outside memory may store microcode instructions. Microcode may allow much of the processor's behavior and programming model to be defined via microprogram routines rather than by dedicated circuitry. Even late in a design process, microcode may easily be changed, whereas hard-wired circuitry designs are cumbersome to change. A processor's microprograms operate on a more hardware-oriented architecture than the assembly instructions visible to programmers. In coordination with the hardware, the microcode implements the programmer-visible architecture. The underlying hardware does not need to have a fixed relationship to the visible architecture, thus, allowing it to be possible to implement a given instruction set architecture (ISA) on a wide variety of underlying hardware micro-architectures. Microprogramming may also reduce the cost of changes to a processor, such as correcting defects, or bugs, in the already-released product. A defect may be fixed by replacing a portion of the microprogram rather than by making changes to hardware logic and wiring.

One or more processing units 115a-115b may include the circuitry for executing instructions of a program, such as a microprogram. As used herein, elements referred to by a reference numeral followed by a letter may be collectively referred to by the numeral alone. For example, processing units 115a-115b may be collectively referred to as processing units 115. Within processing units 115, processor cores 112 include circuitry for executing instructions according to a predefined general-purpose instruction set. For example, the x86 instruction set architecture may be selected. Alternatively, the Alpha®, PowerPC®, or any other general-purpose instruction set architecture may be selected. Generally, processor core 112 accesses the cache memory subsystems 114, respectively, for data and instructions.

Cache subsystems 114 and 118 may comprise high speed cache memories configured to store blocks of data. Cache memory subsystems 114 may be integrated within respective processor cores 112. Alternatively, cache memory subsystems 114 may be coupled to processor cores 114 in a backside cache configuration or an inline configuration, as desired. Still further, cache memory subsystems 114 may be implemented as a hierarchy of caches. Caches which are nearer processor cores 112 (within the hierarchy) may be integrated into processor cores 112, if desired. In one embodiment, cache memory subsystems 114 each represent L2 cache structures, and shared cache subsystem 118 represents an L3 cache structure.

Both the cache memory subsystem 114 and the shared cache memory subsystem 118 may include a cache memory coupled to a corresponding cache controller. If the requested block is not found in cache memory subsystem 114 or in shared cache memory subsystem 118, then a read request may be generated and transmitted to the memory controller within the node to which the missing block is mapped.

Generally, packet processing logic 116 is configured to respond to control packets received on the links to which processing subsystem 100 is coupled, to generate control packets in response to processor cores 112 and/or cache memory subsystems 114, and to generate probe commands and response packets in response to transactions selected by memory controller 120 for service. Interface logic 140 may include logic to receive packets and synchronize the packets to an internal clock used by packet processing logic 116.

Additionally, processing subsystem 100 may include interface logic 140 used to communicate with other subsystems.

Processing subsystem 100 may be coupled to communicate with an input/output (I/O) device (not shown) via interface logic 140. Such an I/O device may be further coupled to a second I/O device. Alternatively, a processing subsystem 100 may communicate with an I/O bridge, which is coupled to an I/O bus.

Software applications and subroutines to be executed on processing subsystem 100 may be written by one or more designers in a high-level language such as C, C++, Fortran, or otherwise. Alternatively, microcode may be written by the designer(s). This source code may be stored on a computer readable medium. A command instruction, which may be entered at a prompt by a user, with any necessary options may be executed in order to compile the source code. In one embodiment, the source code may be statically compiled. In another embodiment, the source code may be dynamically compiled.

During a static front-end compilation, the source code may be translated to an intermediate representation (IR). Syntactic and semantic processing as well as some optimizations may be performed at this step. In one embodiment, the static translation of source code to an IR instead of bytecode, in addition to no use of a virtual machine, allows the source code to be optimized for performance on a particular hardware platform. In another embodiment, the source code may be dynamically compiled to bytecode to be optimized for portability across different computer architectures.

A back-end compilation step may translate the IR to machine code. A static back-end compilation may perform more transformations and optimizations for a particular computer architecture and processor design. For example, a processor is designed to execute instructions of a particular instruction set architecture (ISA), but the processor may have one or more processor cores. The manner in which a software application is executed in order to reach peak performance may differ greatly between a single-, dual-, or quad-core processor. Regardless, the manner in which to compile the software application in order to achieve peak performance may vary between a single-core and a multi-core processor.

One compiler optimization that may be performed is pro-active loop fusion of non-adjacent loops with intervening control flow instructions. Generally speaking, loop fusion is a compiler optimization that fuses two adjacent loops operating over the same loop bounds. Fusing two loops may result in better cache locality and may improve data re-use. Current compiler implementations are able to fuse instances of control-flow equivalent loops that are adjacent to each other. However, many applications and benchmarks have loop fusion candidates that often may be separated by intervening control transfer instructions. In order to fuse non-adjacent loops with intervening control flow instructions, an updated optimization technique may incorporate new steps in the compilation process.

First, for example, a node tree may be built. In one embodiment, the node tree differs from a control flow graph (CFG). In contrast to a control flow graph, each node in a node tree may correspond to a data structure that represents a control flow statement or a basic block of statements of a corresponding computer program. As used herein, a computer program statement is a computer program instruction(s). A control flow statement may be a loop construct statement or an IF statement, such as the beginning of an IF-THEN-ELSE or ELSIF-THEN-ELSE structure. A basic block of statements may include assignment statements and input and output statements. A basic block of statements may be bounded both at the beginning and end by control flow statements. Alternatively, a basic block may be located in program order only subsequent to or only preceding a control flow statement. Although rare, a computer program may simply comprise only a basic block of statements.

A node tree may comprise the parent-child relationships of the nodes. One or more designers may write the instructions of a computer program in a particular order to follow a chosen method or algorithm. The actual real-time instruction selection and execution ordering performed by a processor may differ from the in-program ordering of the instructions as written by the designers. This difference may be due to the out-of-order instruction processing steps and the speculative execution capability of modern processors. In one embodiment, the in-program-order execution of one or more instructions represented by a child node may wait to begin based upon the in-program-order completion of one or more program instructions of a parent node. An analysis of a computer program may identify the in-program-order dependent relationships for starting instruction execution. An analysis of an intermediate representation (IR) of the computer program may also identify these relationships. A node tree built from the results of this analysis may illustrate these relationships.

Referring to FIG. 2, one embodiment of a table 200 holding node types used within a node tree and accompanying descriptions is shown. As can be seen, in one embodiment, a node that represents the top-level node within a node tree for a function is represented by node FUNC. The beginning of an if-region, such as an IF statement, within source code may be marked by a node with a node type of IF. An if-region may comprise the lines of code within an IF-THEN-ELSE structure of a computer program. The nodes THEN and ELSE nodes may mark the corresponding fall-through and non-fall-through paths of an IF statement. The beginning of a loop-region, such as a loop construct statement (e.g. a for loop construct or a do-while loop construct) within a computer program may be marked by a node with a node type of LOOP. A block of straight-line code may be represented by a node with a node type of BLOCK. Other embodiments of node types are possible and contemplated for the use of building a node tree for loop fusion of non-adjacent loops. These node types may also apply to intermediate modifications of the source code. For example, the node tree may be modified multiple times from its original form during compiler optimization steps. During each modification, the node types listed in Table 200 may still describe the nodes in an intermediate version of the modified code.

Figure 3:
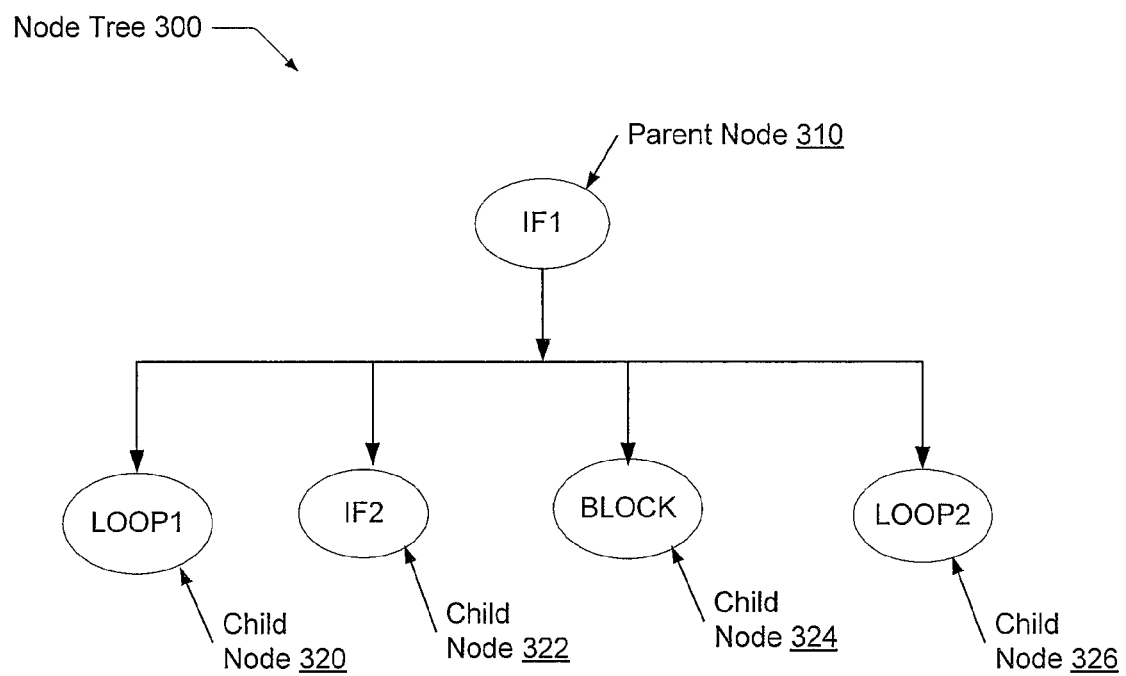
FIG. 3 is a generalized block diagram illustrating one embodiment of a node tree.

Turning now to FIG. 3, one embodiment of a node tree 300 is shown. In this embodiment, a parent node 310 has a node type of IF, which denotes the beginning of an if-region in the code. Within the if-region are four child nodes 320, 322, 324, and 326. Again, the node tree 300 is not a CFG. Therefore, although it appears node tree 300 branches from parent node 310 to have four possible different paths, this is not the case. Rather, each child node 320-326 is one path within the if-region denoted by parent node 310. The sequential ordering of the four child nodes is described by the left-to-right ordering of the child nodes 320-326. Therefore, within the if-region denoted by parent node 310, there is a loop region designated by node 320 followed by a second distinct if-region designated by node 322. Next is a straight line of code designated by node 324, and finally, there is a second loop region designated by node 326. Sample code corresponding to node tree 300 is described shortly below.

Figure 4:
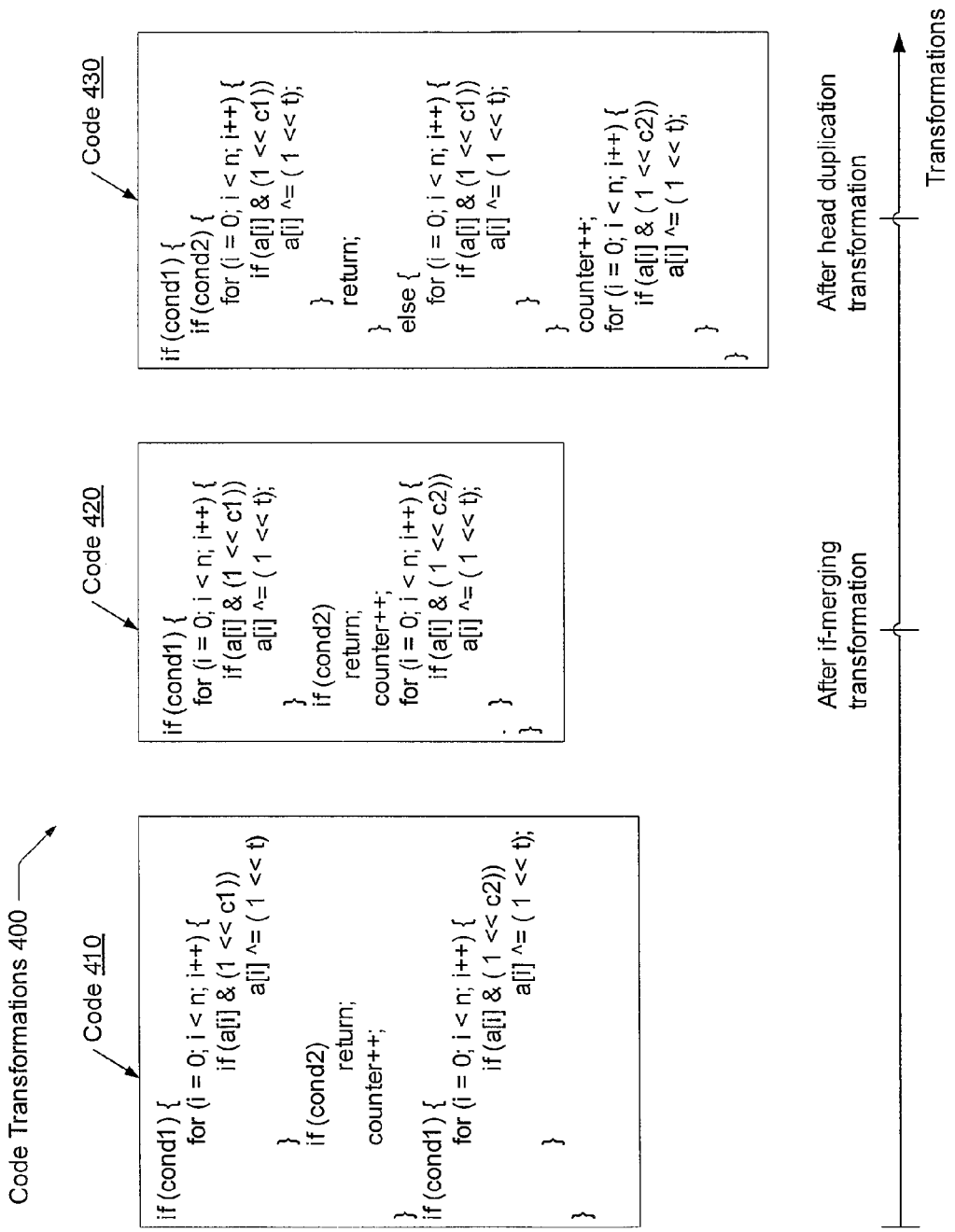
FIG. 4 is a generalized block diagram illustrating one embodiment of sample code modified by legal code transformations.

Referring now to FIG. 4, one embodiment of sample code modified by code transformations 400 is shown. In the example shown, code 410 may be original source code or resulting code after a previous transformation not shown. An if-merging transformation may occur when two if-regions have a same condition expression. For example, code 410 has two if-regions that have the same "cond1" condition expression. Therefore, these two if-regions may be merged and the resulting code is code 420. The lines of code within each if-region with the "cond1" condition expression are merged together and only a single if-region remains as shown in code 420.

A node tree corresponding to code 420 and using the node descriptions of table 200 may appear as node tree 300 of FIG. 3. A parent node 310 may correspond to the first if-region described in the first line of code 420 (e.g. "if (cond1) {"). Child node 320 may correspond to the for-loop construct on the second line of code 420. Child node 322 may correspond to the if-region outside of the first for-loop construct, wherein this if-region is on the sixth line of code 420 (e.g. "if (cond2) "). Next, child node 324 may correspond to the straight-line code (e.g. "counter ++;"). Finally, child node 326 may correspond to the second for-loop construct in code 420. In the embodiment shown, the sequential order of regions within code 420 may be shown as nodes listed left-to-right in node tree 300.

It is noted that both for-loop constructs in code 420 have a same initial value of 0, a same trip count of n, and a same increment value of 1. These are two non-adjacent loops with intervening control flow instructions. They are candidates for proactive loop fusion optimization, which is described shortly below. Code 430 may represent the resulting code after a head duplication transformation occurs on code 420. Head duplication eliminates the back edge of a loop (a side entrance to a cyclic trace) by duplicating and predicating the target of the back edge. The compiler may use head duplication in an attempt to find as much instruction level parallelism (ILP) as possible. It may be beneficial to find the longest list as possible of instructions that don't depend on each other.

In one embodiment, a compiler may search for blocks of instructions that are likely to occur sequentially. These sequential blocks placed together form a superblock. A superblock may have one entry point, but also multiple exit points. The compiler may create superblocks by either static analysis of code at compile time or by inspecting profile information gained from executing code. Both head and tail duplication, both known to those skilled in the art, allow a compiler to create bigger superblocks by essentially copying code. Code 420 and 430 may illustrate new code for a computer program after each stage of optimization, such as the head and tail duplications.

Figure 5:
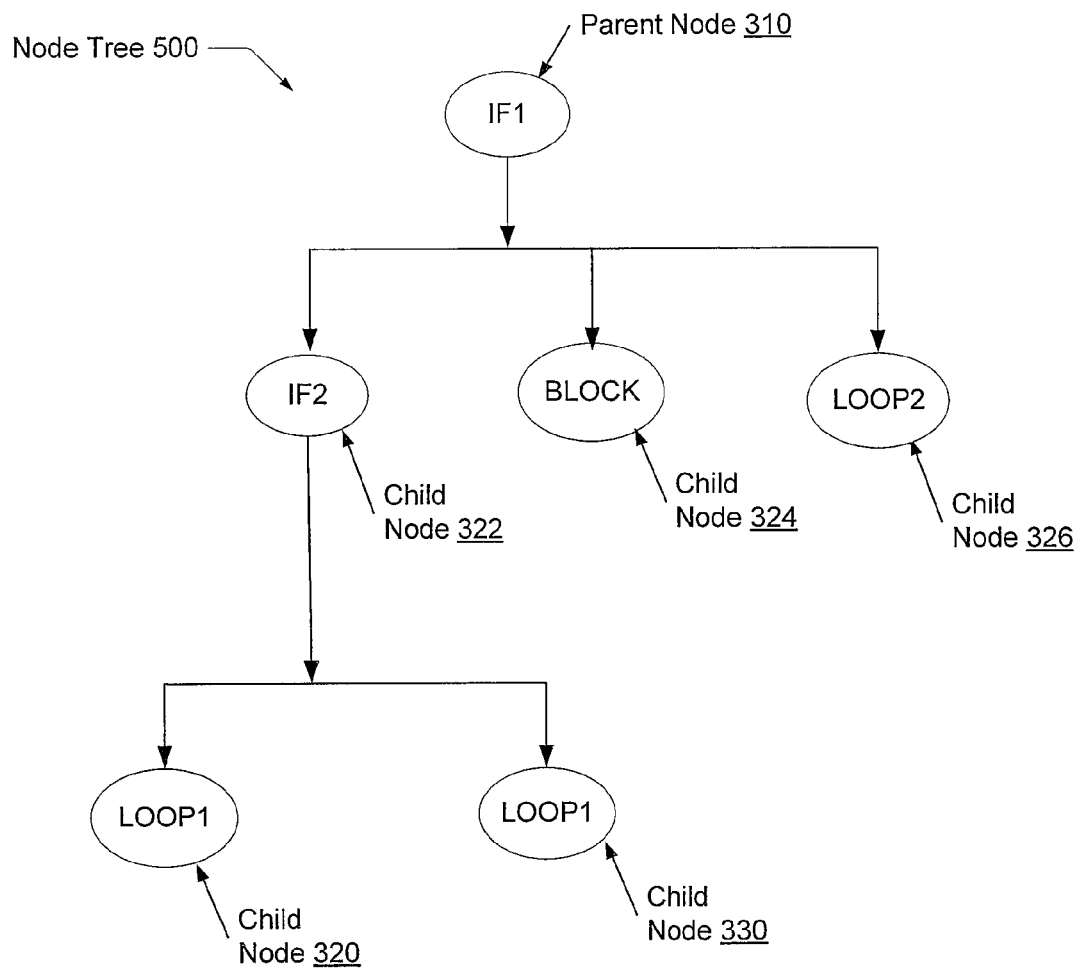
FIG. 5 is a generalized block diagram illustrating one embodiment of a node tree after a head duplication code transformation.

Referring now to FIG. 5, one embodiment of a node tree 500 is shown. In this embodiment, node tree 500 corresponds to code 430 of FIG. 4. It also shows the result of a head duplication transformation on node tree 300 of FIG. 3, which corresponds to code 420. Again, parent node 310 marks an if-region in code 430 and has child nodes 322, 324, and 326. However, the child node 322 is expanded to have both a fall-through path and a non-fall-through path. The fall-though path comprises child node 320 corresponding to the for-loop construct on the third line of code 430. The non-fall-through path comprises new child node 330, which is a copy of child node 320. Child node 330 corresponds to the for-loop construct on the tenth line of code 430. This particular for-loop construct is also within the else-statement of the second if-region (e.g. "if (cond2) {"). It is noted the THEN and ELSE node types of table 200 are not shown in node trees 300 and 500 for simplicity sake. An additional hierarchy of nodes could be shown for these trees, but the general topology and parent-child relationships would generally remain the same.

Figure 6:
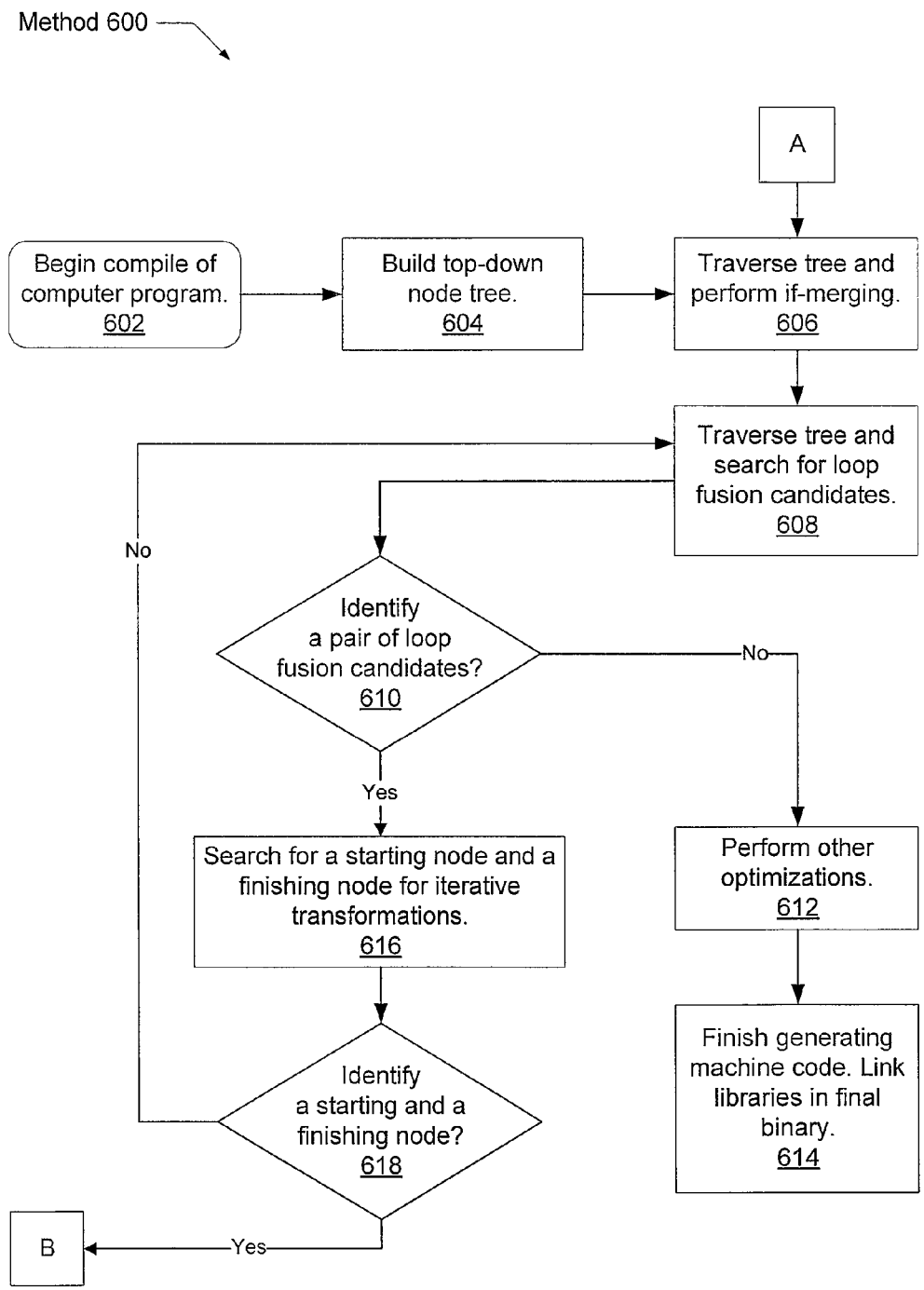
FIG. 6 is a flow diagram illustrating one embodiment of a method for proactive loop fusion of non-adjacent loops with intervening control flow instructions.

Before continuing with node tree transformations, a method outlining steps taken for proactive loop fusion of non-adjacent loops is now presented. Turning now to FIG. 6, one embodiment of a method 600 for proactive loop fusion of non-adjacent loops with intervening control flow instructions is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

In block 602, the software program or subroutine to be analyzed is located. As used herein, program code may refer to any portion of a software application, subroutine, dynamic linked library, or otherwise. A pathname may be entered at a command prompt by a user, a pathname may be read from a predetermined directory location, or other, in order to begin compiling the source code. The program code may be written by a designer in a high-level language such as C, C++, Fortran, or other, or in microcode. In one embodiment, the source code is statically compiled. In such an embodiment, during a static front-end compilation, the source code may be translated to an intermediate representation (IR). A back-end compilation step may translate the IR to machine code. The static back-end compilation may perform more transformations and optimizations.

In block 604, the compiler may build a node tree, wherein node tree 300 is an example. This node tree is not a control flow graph (CFG). In one embodiment, the compiler may use node definitions such as those described by table 200 of FIG. 2. In block 606, the compiler may perform an if-merging transformation on the node tree. Using code 410 of FIG. 4 as an example, the compiler may recognize two if-regions with a same condition expression, such as "cond1". The compiler may merge the lines of code within the corresponding regions and the result may produce code 420. Node tree 300 represents the node parent-child relationships corresponding to code 420.

In block 608, the compiler may traverse the node tree and search for a pair of proactive loop fusion candidates. In one embodiment, in order for a pair of loops to qualify, the pair may need to satisfy the following conditions. The pair of loops has a same initial value, a same trip count or number of iterations, and a same increment value.

Additionally, each loop of the pair of loops, arbitrarily named loop1 and loop2, has a same least common predecessor (LCP). The LCP may be a parent node with respect to the child nodes corresponding to the pair of loops. This particular parent node may be a common higher node with respect to the loop pair child nodes that has the lowest hierarchical level within the node tree. For example, parent node 310 of FIG. 3 is an LCP for both child node 320 and child node 326. If another node existed higher in the node tree hierarchy than node 310, such that node 310 was a child node of this other node, then this other node would not be an LCP for child nodes 320 and 326. Although child nodes 320 and 326 have paths that share this other node, this other node is not the least common predecessor for child nodes 320 and 326.

Further, the length of the path from each loop of the pair to the node that is the LCP may be the same. For node tree 300, the length of the path for both child nodes 320 and 326 is one traversal to parent node 3 10. In more complex examples, each node of the loop pair loop1 and loop2 may be located deeper in the node tree. However, the paths back to the LCP may need to be the same number of traversals. In addition, each pair of nodes on the two paths bypassed in a lock-step fashion during the traversal from each child node to the LCP may be the same type. Further, if this same type corresponds to an if-region, then the conditional expression may be the same. If this same type corresponds to a loop, then this loop pair may need to be legal loop fusion candidates if they were adjacent to one another. Legal loop fusion candidates are candidates that may have a loop fusion code transformation performed without altering the final results of the computer program. The executable run-time may decrease compared to code that does not use loop fusion code transformations, but the final results are the same. Generally speaking, a legal code transformation is an altering of the original source code or an intermediate representation of the source code that does not change the final results of the computer program.

In the example using code 420 and corresponding node tree 300, the two for-loop constructs in the code satisfy the above requirements and are identified as proactive loop fusion candidates. If the compiler is unable to identify a pair of proactive loop fusion candidates (conditional block 610), then in block 612, the compiler may complete other transformations and optimizations on the code according to other well-known techniques. In block 614, the corresponding code is translated to binary machine code. Function calls defined in libraries are included in the binary. Execution of the machine code follows.

Otherwise, if the compiler is able to identify a pair of proactive loop fusion candidates (conditional block 610), such as loop1 and loop2 that satisfy the above requirements, then in block 616, the compiler may search for a pair of proactive loop fusion transformation candidates. This node pair may be used for iterative node transformations that make loop1 adjacent to loop2 in a transformed node tree. Each node transformation may correspond to a code transformation such as a head duplication, a tail duplication, and code motion. A starting node of this node pair may be used for an initial transformation performed on the node tree. A finishing node of this node pair may be used for determining loop1 and loop2 are adjacent in a particular transformed node tree.

In one embodiment, in order for a pair of nodes to qualify, the node pair may need to satisfy the following conditions. This node pair may be arbitrarily named node1 and node2, wherein node1 may be the starting node and node2 may be the finishing node. First, both nodes, node1 and node2, may need to be in the LCP sub-tree that also contains the loop pair that make up the proactive loop fusion candidates. Therefore, both nodes may be immediate children of the LCP. Second, a first node of the pair, node1, may need to precede the second node, node2, in source code order.

Third, the node types of these nodes, node1 and node2, may need to mark an if-region or a loop-region. Fourth, for each node, also referred to as a sibling node, between node1 and node2, may have to have a node type that marks a straight-line block of code or an if-region. If a sibling node marks a straight-line block of code and node1 has a node type that marks a loop-region, then this sibling node may need to satisfy legal requirements to be able to move above node1. In other words, the compiler should know that moving this sibling node above node1 in the source code order does not alter the behavior of the program. On the other hand, if a sibling node marks an if-region, then this sibling node may need to have at least one path that does not have a dependency on loop1 and loop2.

Fourth, for each sibling node inclusively between node1 and node2 that has a node type that marks an if-region, this sibling node may need to have preceding and succeeding sibling nodes satisfy further requirements if they exist. For preceding sibling nodes, these nodes may need to satisfy known conditions for if-merging and head duplication transformations with respect to the sibling node. For succeeding sibling nodes, these nodes may need to satisfy known conditions for if-merging and tail duplication transformations with respect to the sibling node If the compiler is unable to identify a pair of proactive loop fusion transformation candidates (conditional block 618), or the starting and finishing nodes, then control flow of method 600 returns to block 608. Otherwise, control flow of method 600 moves to block B.

Figure 7:
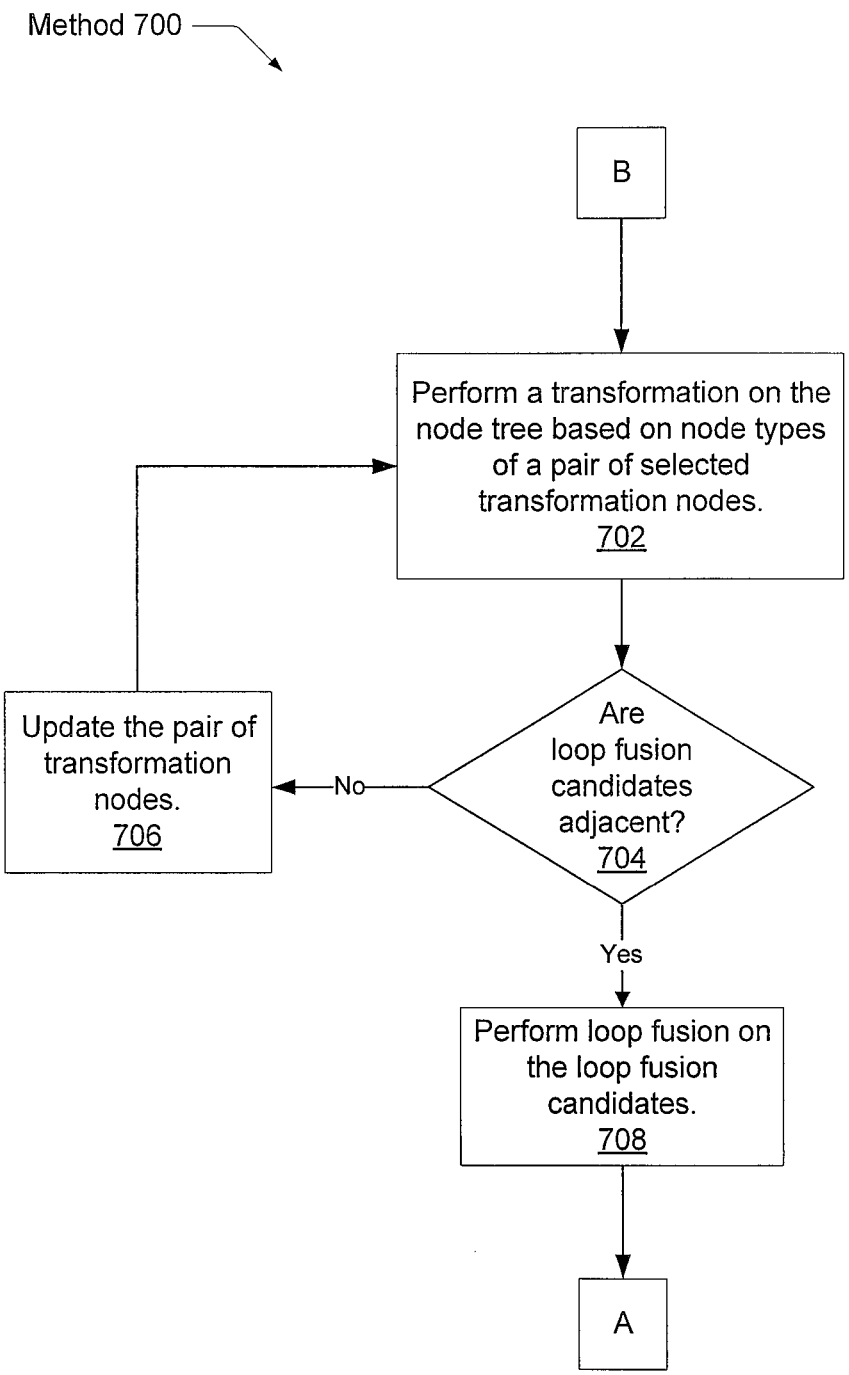
FIG. 7 is a flow diagram illustrating one embodiment of a method for continuing proactive loop fusion of non-adjacent loops with intervening control flow instructions.

Turning now to FIG. 7, one embodiment of a method 700 for continuing to perform proactive loop fusion on non-adjacent loops with intervening control flow instructions is shown. For purposes of discussion, the steps in this embodiment and subsequent embodiments of methods described later are shown in sequential order. However, some steps may occur in a different order than shown, some steps may be performed concurrently, some steps may be combined with other steps, and some steps may be absent in another embodiment.

Block B in FIG. 7 may be reached after a pair of proactive loop fusion transformation candidates, named node1 and node2, are found in method 600. In block 702, each sibling node (inclusively) between node1 and node2 is traversed in order to invoke appropriate transformations that may bring loop1 and loop2 closer to being adjacent. For example, in node tree 300, child nodes 320 and 326 may be identified as loop1 and loop2 as described above. Also, child nodes 320 and 326 may be identified as node1 and node2 as described above. In other words, child nodes 320 and 326 are proactive loop fusion transformation candidates. A compiler may perform transformations on these nodes and the sibling nodes 322 and 324 in order to make nodes 320 and 326 adjacent. If and when nodes 320 and 326 are adjacent, nodes 320 and 326 may have loop fusion performed to create a single loop. Accordingly, more ILP in the program has been found and loop overhead during execution may be reduced.

In one embodiment, appropriate transformations may be based upon node type pairings included in a table. Referring now to FIG. 8, one embodiment of a table 800 of intermediate transformations used to bring non-adjacent loop candidates together is shown. In one embodiment, a first node, arbitrarily named node A, may be initialized to be node1 described above, such as child node 320 in node tree 300. A second node, arbitrarily named node B, may be initialized to an immediate succeeding node of node A, such as child node 322 in node tree 300. The node types of node A and node B, may be used to determine an appropriate transformation. Table 800 shows one embodiment of such a determination. Table 800 will be referred to as methods 600 and 700 continue to be described.

Referring again to FIG. 7 and continuing to use node tree 300 as an example, in block 702, the initial values of node A and node B may be nodes 320 and 322. The corresponding node types may be a loop-region and an if-region, respectively. The third entry of table 800 corresponds to LOOP and IF type nodes respectively, and indicates that a head duplication of the first node into the second node may be performed. Following the head duplication, a subsequent iteration would continue on the second node. The result of such a head duplication transformation is shown with node tree 500 of FIG. 5. Also, an example of the resulting code transformation is shown with code 430 of FIG. 4. It is noted that code 430 is shown as an example for purposes of discussion and may not in fact be generated. Rather, code generation may not be performed until further optimizations have completed.

If the loop fusion candidates loop1 and loop2 (child nodes 320 and 326 in this example) are not adjacent (conditional block 704), then in block 706 node A and node B are updated.

As shown in table 800, a next iteration continues on the second node, or node B. The current node B corresponds to child node 322. Therefore, a new value for node A is child node 322. Looking at node tree 500 of FIG. 5, the immediately succeeding node is child node 324 and a new value for node B is child node 324.

Figure 9:
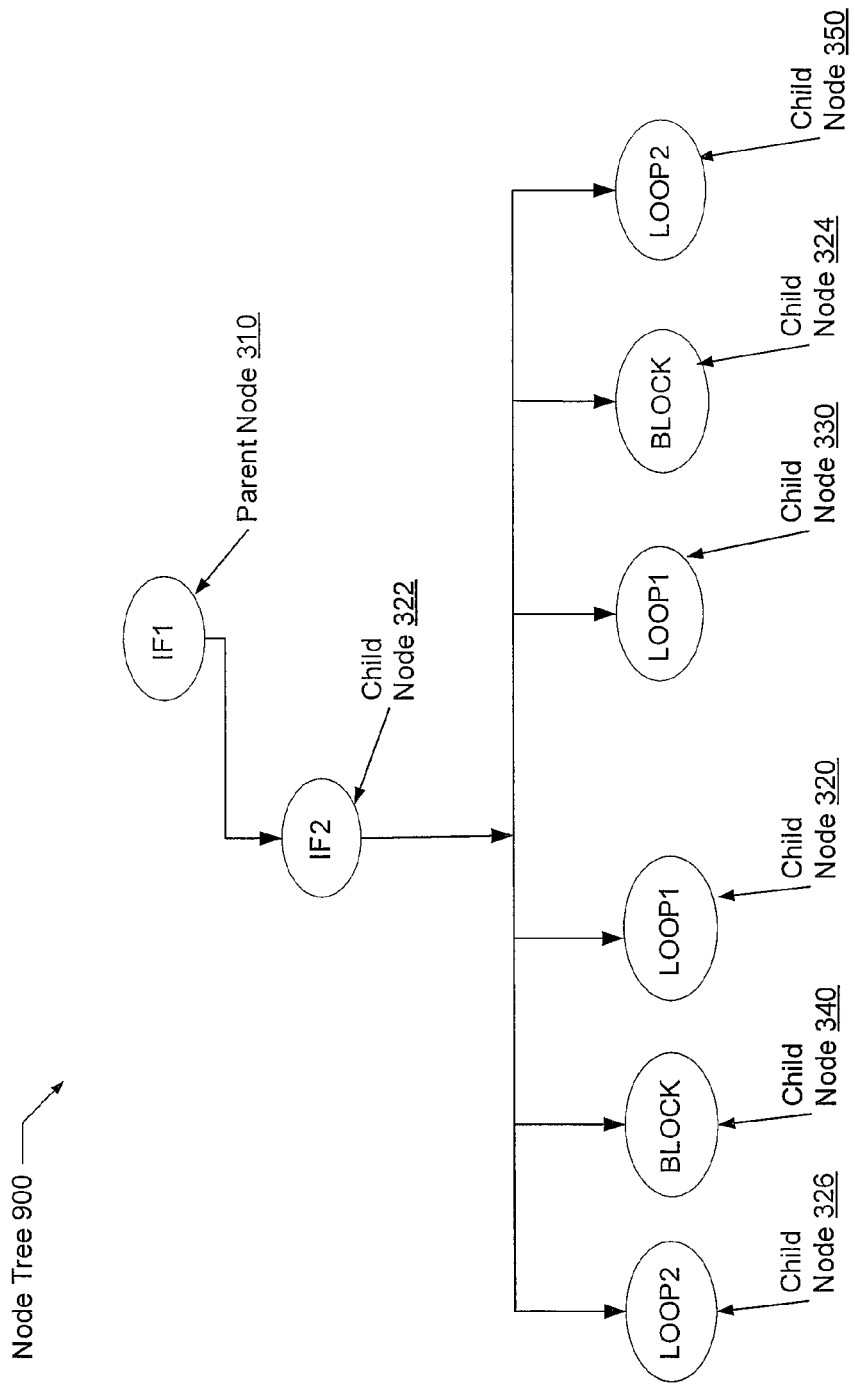
FIG. 9 is a generalized block diagram of one embodiment of a node tree after a tail duplication code transformation.

Referring again to FIG. 7, control flow of method 700 moves from block 706 and returns to block 702. Table 800 is accessed again. Now the node types of node A and node B corresponds to an if-region and a straight-line block of code, respectively. Referring to FIG. 8, the second entry of table 800, which refers to IF and BLOCK type nodes, indicates that a tail duplication of the second node into the first node may be performed. Following the tail duplication, an iteration continues on the first node. FIG. 9 depicts one embodiment of a node tree 900 after a tail duplication code transformation is shown. A further discussion of FIG. 9 is provided below. However, the corresponding code resulting from the tail duplication is first reviewed. FIG. 10 shows one embodiment of sample code modified by tail duplication and code motion code transformations 1000. The resulting code after a tail duplication transformation on code 430 is shown by code 440 of FIG. 10. Code 440 is shown for purposes of discussion and may not in fact be generated. Rather, code generation may not be performed until further optimizations have been performed.

A next iteration continues on the current node A's children, starting from the first child, which corresponds to Node 322. The current node A corresponds to child node 322. Now child node 322 has six children with three children in each of its fall-through path and non-fall-through path. The fall-through path may comprise child nodes 320, 340, and 326. Again, child node 320 may correspond to the for-loop construct on the third line of code 430 and child node 326 may correspond to the second for-loop construct in code 420. Child node 340 may correspond to the seventh and eight lines of code of code 440 of FIG. 10 that comprise the return and the incrementing counter statements. The non-fall-through path may comprise child nodes 330, 324, and 350. Again, child node 330 may correspond to a copy of child node 320 and child node 350 may correspond to a copy of child node 326. Child node 324 may correspond to the straight-line code (e.g. "counter ++;"). Either path may be chosen at this point. Taking the non-fall-through path, a new value for node A is child node 330, which is a copy of the original loop. Looking at node tree 900 of FIG. 9, the immediate succeeding node is child node 340, which is a copy of child node 324. A new value for node B is child node 340.

Figure 11:
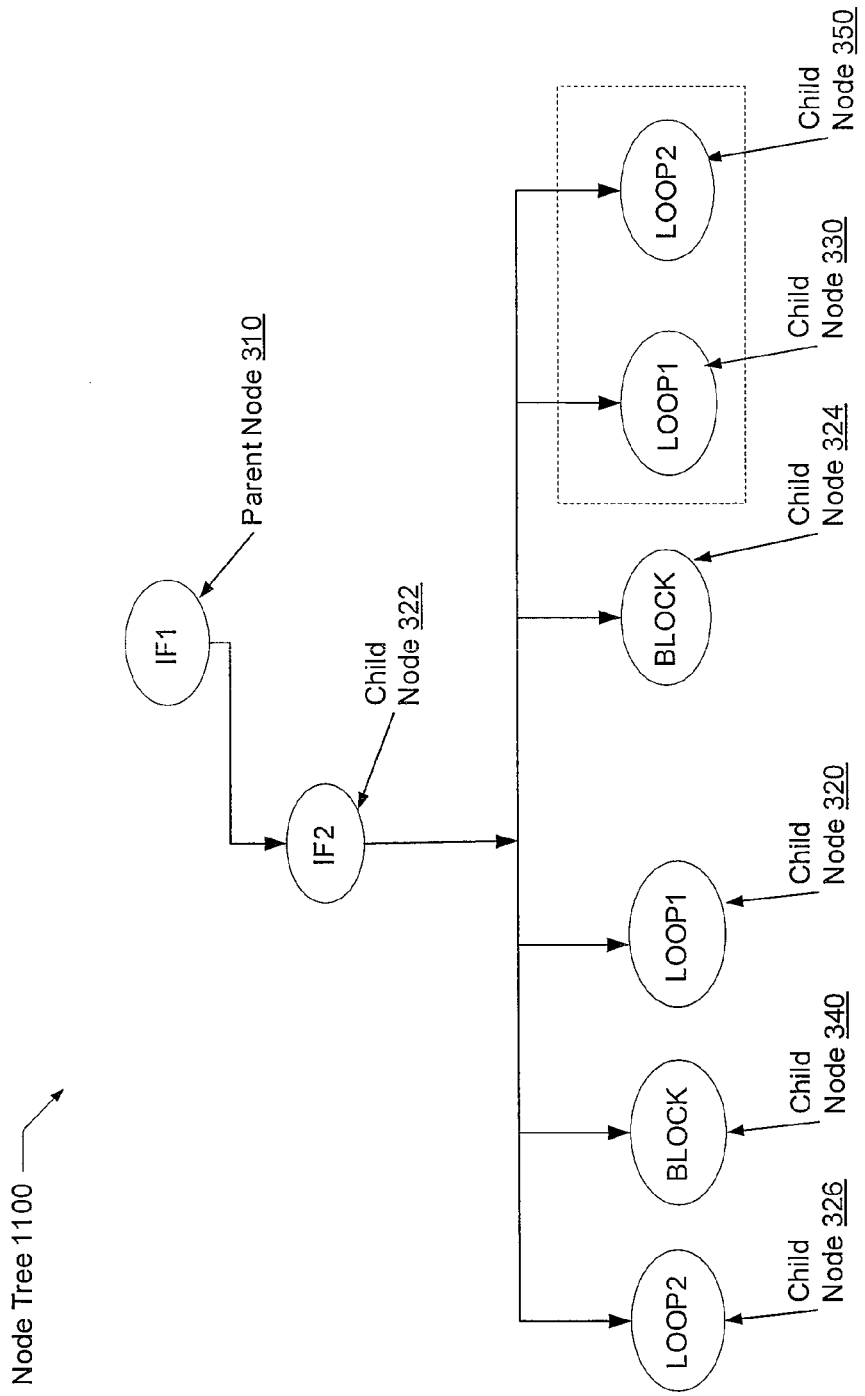
FIG. 11 is a generalized block diagram illustrating one embodiment of a node tree after a code motion code transformation.

Referring again to FIG. 7, control flow of method 700 moves from block 706 and returns to block 702. Table 800 is indexed again. Now the node types of node A and node B mark a loop-region and a straight-line block of code, respectively. Referring to FIG. 8, the first entry of table 800, which refers to LOOP and BLOCK regarding a first node and a second node, determines that a safe code motion of the second node above the first node needs to be performed. Following, an iteration continues on the first node. The resulting code after a code motion transformation on code 440 is shown with code 450 of FIG. 10. Code 450 is shown as an example and may not be generated, since code generation may not be performed until all optimizations have completed. Turning now to FIG. 11, one embodiment illustrating a node tree 1100 after a code motion code transformation is shown. Nodes 330 and 324 are swapped, which makes adjacent the nodes 340 and 350, each of a node type of LOOP.

Referring again to FIG. 7, the loop fusion candidates are now adjacent (conditional block 704). In this case, copies of the original candidates are adjacent. Alternatively, the fall-through path above could have been chosen. However, it may be determined that a safe code motion of the second node, child node 340, above the first node, child node 320, may not be performed. The reason may be that child node 340 comprises an exit statement (e.g. "return"). Therefore, nodes 326 and 320 may not be made adjacent, which preserves the correctness of the original program. Control flow of method 700 moves to block 708 where loop fusion may be performed on these now adjacent loops. Then control flow of method 700 moves to block A. Referring again to FIG. 6, block A moves to block 606 of method 600 where node tree 1100 may be traversed and any qualified if-merging transformation may be performed. In block 608, the compiler may traverse the node tree again and search for a new pair of proactive loop fusion candidates.

As seen above with the descriptions of methods 600 and 700, a general-purpose if-merging transformation along with legal code transformations allow these techniques to expose new code optimizations for each other. The use of a node tree, which may be built from an intermediate representation (IR) of the source code, allows decoupling of a possible loop fusion transformation from control flow graph (CFG) transformations. Methods 600 and 700 may not require control equivalent loops and can handle code with an early return. Also, methods 600 and 700 do not require an absence of data, output, and anti-dependencies on all control flow paths.

Various embodiments may further include receiving, sending or storing instructions and/or data that implement the above described functionality in accordance with the foregoing description upon a computer readable medium. Generally speaking, a computer readable storage medium may include one or more storage media or memory media such as magnetic or optical media, e.g., disk or CD-ROM, volatile or non-volatile media such as RAM (e.g., SDRAM, DDR SDRAM, RDRAM, SRAM, etc.), ROM, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method for loop fusion of non-adjacent loops, the method comprising:

building a node tree that represents parent-child relationships illustrating actual in-program-order execution for each node of a computer program, wherein node types in the tree include types which identify a beginning of at least one of an if-region, a loop region, and a basic block region;

initializing a first transformation node to be the starting node; and performing a node transformation on the first transformation node and a second transformation node immediately succeeding in-program-order to the first transformation node, wherein a type of transformation is based at least in part on node types of the first and second transformation nodes, wherein the node transformation comprises:

when either of the first transformation node or the second transformation node identifies a beginning of an if-region regardless of dependences: if-merging, head duplication, or tail duplication;

when each of the first transformation node and the second transformation node identifies a beginning of a loop region: loop fusion; and when the first transformation node and the second transformation node identifies a beginning of a loop region and a basic block region, respectively: code motion;
performing loop fusion on a first loop corresponding to a first loop node and on a second loop corresponding to a second loop node, said first and second loops being non-adjacent with an intervening in-program-order control flow instruction comprising an unconditional branch instruction, said performing occurring when:
a path length from the first loop node and the second loop node to a same least common predecessor (LCP) node in the node tree is the same; and
each node traversed along a path from the first loop node to the LCP, if any, has a same node type as a corresponding node traversed in a path from the second loop node to the LCP.

2. The method as recited in claim 1, further comprising determining whether said loop fusion may be performed, wherein said determining comprises:
identifying a starting node and identifying a finishing node non-adjacent to the starting node, wherein the starting node precedes the finishing node in program order, wherein the starting node and the finishing node are immediate children of the LCP; and
determining a node type of each of the starting node and the finishing node corresponds to a control flow statement or a loop region.

3. The method as recited in claim 2, wherein said determining further comprises determining a node type of each intervening node between the starting and the finishing nodes corresponds to an IF statement or a basic block of sequential statements in the computer program.

4. The method as recited in claim 1, wherein said parent-child relationships identify one or more computer program instructions represented by a child node that may wait to begin in-program-order execution based upon the in-program-order completion of one or more program instructions of a parent node.

5. The method as recited in claim 1, wherein said same node type corresponds to (i) a same control flow statement with a same conditional expression, or (ii) a basic block of sequential statements.

6. The method as recited in claim 1, further comprising:
updating the first transformation node to be the second transformation node within a transformed node tree, in response to the performed transformation being a head duplication;
updating the first transformation node to be the first transformation node within a transformed node tree, in response to the performed transformation not being a head duplication; and
updating the second transformation node to a node within the transformed node tree immediately succeeding in-program-order to the updated first transformation node.

7. The method as recited in claim 2 further comprising determining whether the first and the second loops are candidates for loop fusion by determining whether the first and the second loops have a same initial value, a same trip count value, and a same increment value.

8. A system comprising:
a processor and a memory;
a compiler;
an optimizer; and
a code generator wherein when executed by the processor is configured to generate new code for a computer program after optimization by the optimizer;
wherein when executed by the processor the optimizer is configured to:
build a node tree that represents parent-child relationships illustrating actual in-program-order execution for each node of a computer program, wherein node types in the tree include types which identify a beginning of at least one of an if-region, a loop region, and a basic block region;
initialize a first transformation node to be the starting node; and
perform a node transformation on the first transformation node and a second transformation node immediately succeeding in-program-order to the first transformation node, wherein a type of transformation is based at least in part on node types of the first and second transformation nodes, wherein the node transformation comprises:
when either of the first transformation node or the second transformation node identifies a beginning of an if-region regardless of dependences: if-merging, head duplication, or tail duplication;
when each of the first transformation node and the second transformation node identifies a beginning of a loop region: loop fusion; and
when the first transformation node and the second transformation node identifies a beginning of a loop region and a basic block region, respectively: code motion;
perform loop fusion on a first loop corresponding to a first loop node and on a second loop corresponding to a second loop node, said first and second loops being non-adjacent with an intervening in-program-order control flow instruction comprising an unconditional branch instruction, said performing occurring when:
a path length from the first loop node and the second loop node to a same least common predecessor (LCP) node in the node tree is the same; and
each node traversed along a path from the first loop node to the LCP, if any, has a same node type as a corresponding node traversed in a path from the second loop node to the LCP.

9. The system as recited in claim 8, wherein the optimizer when executed by the processor is further configured to determine whether said loop fusion may be performed by performing steps which include:
identifying a starting node and identifying a finishing node non-adjacent to the starting node, wherein the starting node precedes the finishing node in program order, wherein the starting node and the finishing node are immediate children of the LCP; and
determining a node type of each of the starting node and the finishing node corresponds to a control flow statement or a loop region.

10. The system as recited in claim 9 wherein said determining further comprises determining a node type of each intervening node between the starting and the finishing nodes corresponds to an IF statement or a basic block of sequential statements in the computer program.

11. The system as recited in claim 8, wherein said parent-child relationships identify one or more computer program instructions represented by a child node that may wait to begin in-program-order execution based upon the in-program-order completion of one or more program instructions of a parent node.

12. The system as recited in claim 8, wherein said same node type corresponds to (i) a same control flow statement with a same conditional expression, or (ii) a basic block of sequential statements.

13. The system as recited in claim 8 further comprises:
update the first transformation node to be the second transformation node within a transformed node tree, in response to the performed transformation being a head duplication;
update the first transformation node to be the first transformation node within a transformed node tree, in response to the performed transformation not being a head duplication; and
update the second transformation node to a node within the transformed node tree immediately succeeding in-program-order to the updated first transformation node.

14. A non-transitory computer readable storage medium storing program instructions operable to perform loop fusion of non-adjacent loops, wherein the program instructions are executable to:
build a node tree that represents parent-child relationships illustrating actual in-program- order execution for each node of a computer program, wherein node types in the tree include types which identify a beginning of at least one of an if- region, a loop region, and a basic block region;
initialize a first transformation node to be the starting node; and
perform a node transformation on the first transformation node and a second transformation node immediately succeeding in-program-order to the first transformation node, wherein a type of transformation is based at least in part on node types of the first and second transformation nodes, wherein the node transformation comprises:
when either of the first transformation node or the second transformation node identifies a beginning of an if-region regardless of dependences: if-merging, head duplication, or tail duplication;
when each of the first transformation node and the second transformation node identifies a beginning of a loop region: loop fusion; and
when the first transformation node and the second transformation node identifies a beginning of a loop region and a basic block region, respectively: code motion
perform loop fusion on a first loop corresponding to a first loop node and on a second loop corresponding to a second loop node, said first and second loops being non-adjacent with an intervening in-program-order control flow instruction comprising an unconditional branch instruction, said performing occurring when:
a path length from the first loop node and the second loop node to a same least common predecessor (LCP) node in the node tree is the same; and
each node traversed along a path from the first loop node to the LCP, if any, has a same node type as a corresponding node traversed in a path from the second loop node to the LCP.

15. The non-transitory storage medium as recited in claim 14, wherein the program instructions are further executable to determine whether said loop fusion may be performed by performing steps which include:
identifying a starting node and identifying a finishing node non-adjacent to the starting node, wherein the starting node precedes the finishing node in program order, wherein the starting node and the finishing node are immediate children of the LCP;
and determining a node type of each of the starting node and the finishing node corresponds to a control flow statement or a loop region.

16. The non-transitory storage medium as recited in claim 15 wherein said determining further comprises determining a node type of each intervening node between the starting node and the finishing node corresponds to an IF statement or a basic block of sequential statements in the computer program.

* * * * *